United States Patent [19]

Robbins

[11] Patent Number: 4,489,988
[45] Date of Patent: Dec. 25, 1984

[54] METHOD AND APPARATUS FOR PROVIDING A SEALED TRAILER WHEEL

[76] Inventor: Jerry L. Robbins, 21 Bowman Ct., Greenfield, Ind. 46140

[21] Appl. No.: 383,827

[22] Filed: Jun. 1, 1982

[51] Int. Cl.³ .............................................. B60B 27/02
[52] U.S. Cl. ................................. 301/108 S; 301/123
[58] Field of Search ............ 301/105 R, 108 R, 108 S, 301/108 SC, 123

[56] References Cited

U.S. PATENT DOCUMENTS

| | | | |
|---|---|---|---|
| 1,163,026 | 12/1915 | Mason et al. .................. | 301/105 R |
| 1,173,638 | 2/1916 | Baninger ........................ | 301/105 R |
| 3,149,883 | 9/1964 | Reilly . | |
| 3,226,162 | 12/1965 | Eberle ............................ | 301/108 R |
| 3,330,563 | 7/1967 | De Puydt et al. ............. | 301/105 R |
| 3,393,015 | 7/1968 | Kaufman . | |
| 3,649,080 | 3/1972 | Molinare ........................ | 301/108 R |
| 3,785,706 | 1/1974 | Vangalis ........................ | 301/108 A |
| 3,955,852 | 5/1976 | De Puydt et al. ............. | 301/108 R |
| 4,106,816 | 8/1978 | August ........................... | 301/108 R |

*Primary Examiner*—David A. Scherbel
*Attorney, Agent, or Firm*—Woodard, Weikart, Emhardt & Naughton

[57] ABSTRACT

An apparatus for providing a sealed trailer wheel assembly is disclosed which includes a waterproof cap sealing the outside of the wheel hub, an air housing providing a substantial enclosure of the space between the inside of the hub and the axle, and an air compressor supplying pressurized air to the enclosure at a rate sufficient to prevent water, sand or other materials from entering into the enclosure and thereby into the location of the wheel bearings. A related method is also disclosed.

9 Claims, 2 Drawing Figures

METHOD AND APPARATUS FOR PROVIDING A SEALED TRAILER WHEEL

BACKGROUND OF THE INVENTION

1. Field of the Invention

The present invention relates to the field of trailer wheels, and more particularly to a trailer wheel and method to seal the wheel bearings and associated components from water.

2. Description of the Prior Art

As is well known, boat trailers are frequently subjected to relatively difficult environmental use. Conventional hubcabs, while serving to protect the hub axle and bearing assemblies from contamination under certain conditions, are not always satisfactory for protecting the hub assemblies when they are immersed in water, as occurs as a result of normal use of the boat trailer. Due to the small diameter of the wheels of a boat trailer in relation to the diameter of the wheels of a towing vehicle, the hub axle and bearing assemblies of the wheels of the trailer frequently attain relatively high temperatures, especially when the trailer is towed for several hours over highways. When such conditions exist, they tend to liquefy the lubricant and, due to centrifugal force, air and lubricant escape from within the hubcab.

Frequently after a boat trailer has been towed many miles it is then backed into cold water to facilitate the removal and floating of the boat on the water. When this occurs, the entire hub assembly is suddenly cooled, contracting the air and lubricant within the cap and around the bearing assemblies. This creates a partial vacuum which causes water, sand and other contaminants to seep into the hub cap assembly in direct contact with the axle and bearings. When water enters the hubcab assemblies, it eventually causes rust and corrosion of parts of the wheel assembly and creates serious problems for safe, efficient and continued use of the trailer.

Various attempts have been made in order to overcome these problems associated with trailer wheels. In U.S. Pat. No. 3,785,706, issued to Vangalis on Jan. 15, 1974, there is disclosed a pressurized hub cap for a vehicle wheel. The Vangalis patent describes a cup-shaped cap having a flange which seats on the wheel hub. A helical spring urges a piston in the direction of the axle of the trailer to hold grease on the outside of the axle and associated nut. A vent hole is provided on the outside of the piston, and a second hole is provided to allow the escape of grease in the event that excessive expansion of the grease occurs. A similar construction is described in U.S. Pat. No. 4,106,816, issued to August on Aug. 15, 1978. In U.S. Pat. No. 3,955,852, issued to De Puydt et al. on May 11, 1976, there is also described a trailer hubcap device utilizing a spring-biased piston to pressurize grease against the outside of the axle and nut. The De Puydt et al. patent further describes a manual actuator to permit the pressure to be relieved while the trailer is being moved along a roadway.

A related hubcap construction is described in U.S. Pat. No. 3,649,080, issued to Molinare on Mar. 14, 1972. This patent describes a hubcab construction which includes a grease fitting to permit introduction of grease into the cap and also a pressure relief valve to provide for expansion of the grease. In U.S. Pat. No. 3,393,015, issued to Kaufman of July 16, 1968, there is described a hubcap which includes an O-ring normally positioned over a vent hole to prevent the entrance of water within the cap, but which will expand to uncover the hole for permitting air and grease to be vented from the hubcap when heated. A protective hubcap closure is described in U.S. Pat. No. 3,149,883, issued to Reilly on Sept. 22, 1964. The Reilly patent describes a hubcap which is flexible to become contracted or compressed when the trailer is immersed in cold water.

A different approach to the waterproofing for a hubcap is described in the Eberle patent, U.S. Pat. No. 3,226,162, issued on Dec. 28, 1965. The Eberle patent describes the use of a tube connecting from the pressurized tire to the hubcap, for permitting air to be vented into the hubcap as a method for pressurizing the cap to prevent entrance of water.

SUMMARY OF THE INVENTION

Briefly described in one aspect of the present invention there is provided an apparatus for a sealed trailer wheel assembly, the assembly including an axle, a wheel hub mounted to the axle upon two sets of bearings, and a nut threaded onto the axle to retain the hub. The apparatus includes a water-proof cap sealingly mounted to an outer flange of the hub and enclosing the nut and the end of the axle. The apparatus further includes an air housing means for defining an enclosure supplied with compressed air to prevent water from entering into the enclosure. A related method for providing a sealed trailer wheel assembly is also provided.

It is an object of the present invention to provide an apparatus for ensuring a seal of the wheel assembly for boat trailers and the like.

It is another object of the present invention to provide an apparatus for a leak proof wheel assembly which is easily adapted to existing wheel assemblies and is relatively inexpensive and easy to install.

A further object of the present invention is to provide a method for ensuring a water-proof seal for a trailer wheel and the like.

Further objects and advantages of the present invention will become apparent from the description of the preferred embodiment which follows.

DESCRIPTION OF THE PREFERRED EMBODIMENT

Figure 1:
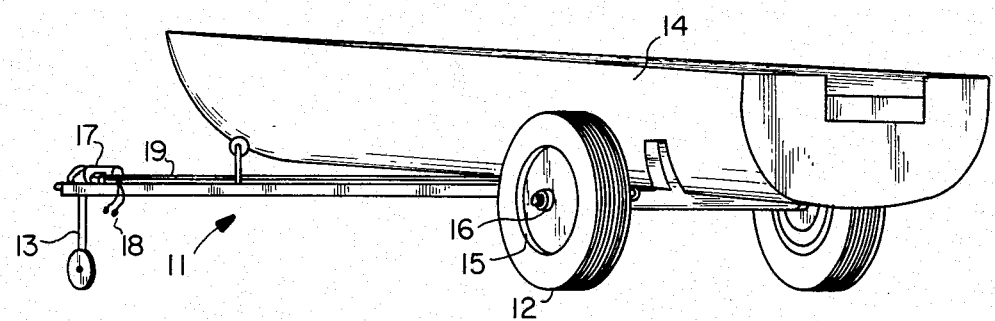
FIG. 1 is a perspective view of a boat trailer including a boat positioned thereon and also including a sealing means for a wheel assembly constructed in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown in FIG. 1 a trailer 11 including a pair of wheels 12 and a front support 13. A boat 14 is shown received by the trailer in usual fashion. Each of the wheels includes a wheel rim 15 which includes a hub sealed by a cap 16 as will be further described below. An air compressor 17 is positioned at the front of the trailer and includes wire connections 18 connectable with the wiring system of a towing vehicle, and also an air hose 19 to provide pressurized air to the present apparatus as is further described herein.

Figure 2:
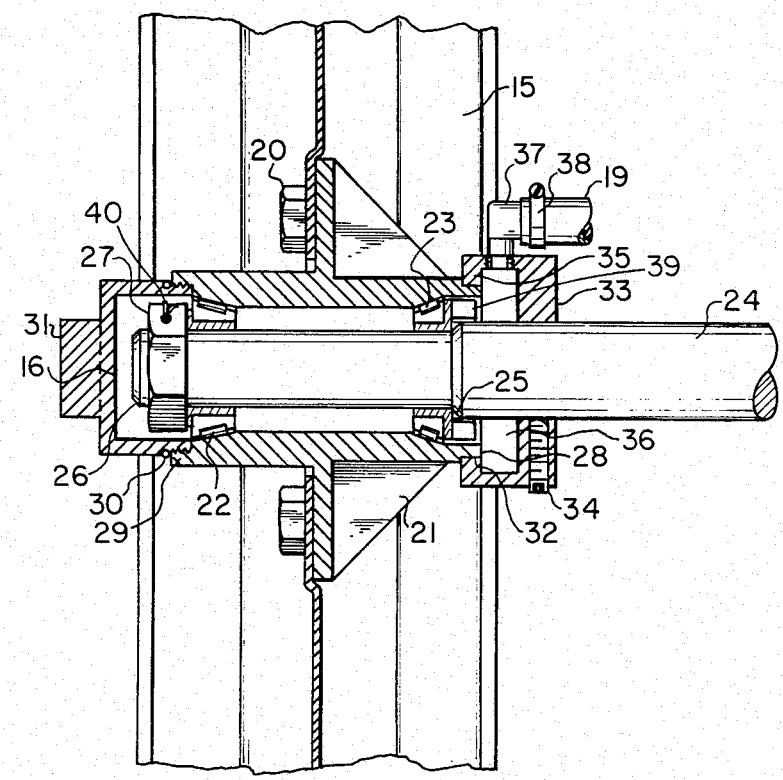
FIG. 2 is a front, cross-sectional view of an apparatus constructed in accordance with the present invention.

Referring in particular to FIG. 2, there is shown a cross-sectional view of a wheel rim 15 secured by bolts 20 to a wheel hub 21. The hub 21 is received over two sets of bearings 22 and 23 which provide for relative rotation of the hub and the axle 24 in usual fashion. Axle 24 includes a shoulder portion 25 against which a race of the inner bearing 23 is received. A grease seal 39 is mounted on the inside of bearing 23 to seal grease in and around the bearings. The end of the axle 24 is provided with threads 26 and nut 27 is received thereon to retain the hub on the axle. The nut 27 is secured to the axle by a cotter pin 40.

The wheel hub 21 includes an inner flange 28 and an outer flange 29. A water-proof cap 16 is sealingly mounted to the outer flange 29 and encloses the nut 27 and the end of the axle 24. Preferably, the outer flange 29 is provided with threads and the cap 16 is similarly provided with threads to be received by the flange 29. An O-ring 30, along with the preferable use of a waterproofing tape, such as a Teflon tape, on the threads of the cap 16, provide a watertight seal of the cap with the outer flange. The cap preferably has a hollow, cylindrical construction with a hexagonal head 31 to facilitate its installation and/or removal. The threaded portions of the outer flange 29 and the cap 16 are suitably about ⅜" in length.

The inner flange 28 preferably has an outer cylindrical surface 32, which may be obtained by turning down the flange on a lathe to achieve uniform roundness and balance for the hub which is normally a cast item. An air housing 33 is then preferably secured by set screws 34 to the axle 24. The housing 33 includes an inwardly-extending flange 35 which is positioned adjacent the outer cylindrical surface 32 of the inner flange 28 thereby providing a substantial enclosure of the area of the inner flange and the axle.

The air housing 33 includes a cavity 36 in the area of the inner flange and the axle. A tapped hole extends through the air housing and an air hose fitting 37, preferably made of brass, is received in the tapped hole and connected by means of a hose clamp 38 to the air hose 19. In this manner, compressed air from the compressor 17 is pumped through the hose 19 and the fitting 37 and into the cavity 36. The air compressor 17 is connectable to a 12 volt system, such as would be available by means of connection with the wiring of a towing vehicle. The compressor is sized to provide a sufficient rate of air flow and pressure to the cavity 36 to prevent water or other contaminants from entering into the cavity through the small gap between the flange 35 and the inner flange 28. This gap may suitably be sized at about 1/32" to permit rotation of the hub relative the axle while also being sufficiently small so that the forcing of air through the gap will prevent water, sand, and other contaminants from entering into the cavity. The air housing 33 is also secured to the axle 24 in a substantially sealed fit, and the compressed air further ensures that no contaminants enter the enclosure at this location.

As previously indicated, it has been well recognized in the prior art that the entry of water and other contaminants to the interior of the wheel hub 21 provides several potential problems. Such materials can result in a breakdown of the lubricating protection of the grease of the bearings, allowing excessive heat to build up and causing bearing failure. The prior art has also recognized the susceptibility of trailer wheels to conditions under which a partial vacuum may be created within the hub which could draw water into the area. The present invention provides an apparatus and associated method which counteracts this vacuum and provides a positive pressure to resist the inflow of water and other contaminants under various conditions. A control is provided for the air compressor 17 in usual fashion and thus the compressor can be actuated only when problem conditions are contemplated, such as when the trailer is to be backed down into the water for releasing or loading a boat.

In the method of the present invention, it will be appreciated that a first step is the sealing of the outer flange of the hub, by a device such as a cap 16. In particular, the outer flange is sealed to provide a sealed enclosure of the nut 27 and the end of the axle 24. A second step is the mounting of a housing at the inside of the hub to provide a substantial enclosure of the space between the inner flange 28 and the axle 24, which of course is the other potential site for entry of water to the wheel bearings. Pressurized air is then introduced into the area enclosed by the housing to provide an equal or excess pressure within the bearing cavities to prevent the inflow of water or other undesired materials.

It will be appreciated that certain variations can be made in the present invention without parting from the scope or intention of the invention. For example, the air housing may be mounted to the inner flange and may include a portion positioned adjacent the axle to again provide a substantially sealed enclosure of the area between the inner flange of the hub and the axle. In this version, the air would typically be directed into the enclosure through a hole in the non-rotating axle. Various air supply means could be used in lieu of the air compressor 17.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for providing a sealed trailer wheel assembly, the assembly including an axle, a hub mounted to the axle and received over two sets of bearings positioned between the axle and the hub to provide for rotation of the hub relative the axle, a grease seal, a nut threaded onto the end of the axle and secured thereto by a cotter pin to retain the hub on the axle, the hub including an inner flange and an outer flange, said apparatus comprising:

a water-proof cap sealingly mounted to the outer flange of the hub and enclosing the nut and the end of the axle;

air housing means for providing a substantially sealed enclosure of the space between the inner flange of the hub and the axle, said air housing means including a housing extending adjacent to but spaced from the inner flange of the hub; and air supply means for supplying pressurized air to the enclosure defined by said air supply housing at a rate sufficient to prevent water, sand and other contaminants from entering the enclosure through the spacing between the air supply housing and the inner flange of the hub.

2. The apparatus of claim 1 in which said air housing means includes an air housing connected to the axle.

3. The apparatus of claim 2 in which said air housing includes at least one set screw positioned to bear against the axle for connecting said air housing to the axle.

4. The apparatus of claim 1 in which said air supply means includes an air compressor secured to the trailer and connectable to the wiring of a towing vehicle.

5. The apparatus of claim 4 in which said air supply means further includes a connection extending through and secured to said air housing and a hose connecting from the air compressor to the connection.

6. The apparatus of claim 5 in which said air housing means includes an air housing connected to the axle.

7. The apparatus of claim 6 in which said air housing includes at least one set screw positioned to bear against the axle for connecting said air housing to the axle.

8. The apparatus of claim 7 in which the inner flange has an outside cylindrical surface and said air housing includes an inwardly-extending flange positioned adjacent the outside surface.

9. A method for providing a sealed trailer wheel assembly, the assembly including an axle, a hub mounted to the axle and received over two sets of bearings positioned between the axle and the hub to provide for rotation of the hub relative the axle, a grease seal, a nut threaded onto the end of the axle and secured thereto by a cotter pin to retain the hub on the axle, the hub including an inner flange and an outer flange, said method including the steps of:

(a) sealing the outer flange of the hub to enclose the nut and the end of the axle;

(b) mounting an air housing over the axle and adjacent the inner flange of the hub to substantially enclose the space between the axle and the inner flange, said mounting including mounting a housing extending adjacent to but spaced from the inner flange of the hub; and (c) forcing compressed air into the space enclosed by the air housing to prevent water, sand and other contaminants from entering the enclosure through the spacing between the air housing and the inner flange of the hub.

* * * * *